(12) United States Patent
Xie et al.

(10) Patent No.: US 10,164,673 B2
(45) Date of Patent: Dec. 25, 2018

(54) DC OFFSET CANCELLATION METHOD AND DEVICE

(71) Applicant: Sanechips Technology Co., Ltd., Shenzhen (CN)

(72) Inventors: Haolv Xie, Shenzhen (CN); Yongtao Wang, Shenzhen (CN); Zhuoyao Wang, Shenzhen (CN); Muheng Fu, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 9 days.

(21) Appl. No.: 15/528,104

(22) PCT Filed: Mar. 23, 2015

(86) PCT No.: PCT/CN2015/074881
§ 371 (c)(1),
(2) Date: Jul. 5, 2017

(87) PCT Pub. No.: WO2016/078273
PCT Pub. Date: May 26, 2016

(65) Prior Publication Data
US 2017/0324435 A1    Nov. 9, 2017

(30) Foreign Application Priority Data

Nov. 19, 2014    (CN) .......................... 2014 1 0663851

(51) Int. Cl.
*H04L 27/26*    (2006.01)
*H04L 1/00*    (2006.01)
(Continued)

(52) U.S. Cl.
CPC ................. *H04B 1/12* (2013.01); *H04B 1/16* (2013.01); *H04B 1/30* (2013.01); *H04L 27/20* (2013.01)

(58) Field of Classification Search
CPC ............... H04L 27/2626; H04L 5/0053; H04L 27/2602; H04L 27/2627; H04L 1/0041;
(Continued)

(56) References Cited

U.S. PATENT DOCUMENTS 7,593,485 B2    9/2009  Wong
7,602,861 B2   10/2009  Wong
(Continued)

FOREIGN PATENT DOCUMENTS

CN    1376329 A    10/2002
CN    1445932 A    10/2003
(Continued)

OTHER PUBLICATIONS

International Search Report in international application No. PCT/CN2015/074881, dated Jun. 30, 2015.
(Continued)

*Primary Examiner* — Sam K Ahn
*Assistant Examiner* — Sarah Hassan
(74) *Attorney, Agent, or Firm* — Oppedahl Patent Law Firm LLC

(57) ABSTRACT

Disclosed is a DC offset cancellation (DCOC) method, comprising: after a receiver is electrified, acquiring a digital signal of an offset voltage at a circuit output port in the receiver, obtaining a digital control signal for controlling a DCOC output stage from the digital signal, and outputting, by the DCOC output stage, a current to a corresponding circuit of the receiver according to the digital control signal. Also disclosed is a DC offset cancellation device.

10 Claims, 2 Drawing Sheets

(51) Int. Cl.
*H04B 1/12* (2006.01)
*H04L 27/20* (2006.01)
*H04B 1/16* (2006.01)
*H04B 1/30* (2006.01)

(58) Field of Classification Search
CPC ..... H04L 27/2608; H04L 27/18; H04L 27/20; H04L 27/36; H04L 27/367; H04L 1/0075; H04L 1/08
USPC .......................................... 375/260; 348/723
See application file for complete search history.

(56) References Cited

U.S. PATENT DOCUMENTS

| | | | |
|---|---|---|---|
| 2002/0160734 A1* | 10/2002 | Li | H03G 3/3068 455/245.1 |
| 2004/0247046 A1* | 12/2004 | Hsiao | H04L 25/061 375/319 |
| 2005/0153676 A1 | 7/2005 | Ruelke | |
| 2005/0248478 A1 | 11/2005 | Ling | |
| 2006/0073803 A1 | 4/2006 | Igarashi | |
| 2006/0099917 A1 | 5/2006 | Papathanasiou | |
| 2006/0258317 A1 | 11/2006 | Watanabe | |
| 2007/0170357 A1 | 7/2007 | Arseneau | |
| 2007/0280379 A1 | 12/2007 | Wong | |
| 2008/0009250 A1 | 1/2008 | Wong | |
| 2009/0305656 A1 | 12/2009 | Chiu | |
| 2010/0219996 A1 | 9/2010 | Abel | |
| 2011/0081877 A1 | 4/2011 | Seendripu | |
| 2011/0286553 A1 | 11/2011 | Min | |
| 2014/0148114 A1 | 5/2014 | Li et al. | |

FOREIGN PATENT DOCUMENTS

| | | |
|---|---|---|
| CN | 101286961 A | 10/2008 |
| CN | 102025667 A | 4/2011 |
| CN | 103067007 A | 4/2013 |
| CN | 103236864 A | 8/2013 |
| CN | 103607209 A | 2/2014 |

OTHER PUBLICATIONS

English Translation of the Written Opinion of the International Search Authority in international application No. PCT/CN2015/074881, dated Jun. 30, 2015.
Supplementary European Search Report in European application No. 15861845.4, dated Nov. 23, 2017.

* cited by examiner

DC OFFSET CANCELLATION METHOD AND DEVICE

TECHNICAL FIELD

The disclosure relates to a receiver technology, and particularly, to a direct current offset cancellation (DCOC) method and device.

BACKGROUND

In a receiver, since the receiver needs to amplify a received weak signal, the gain of the receiver is very high and typically may be up to 60 dB-80 dB. A high-gain circuit usually has a relatively large direct current offset due to an unmatched circuit. This is the case for the receiver. The circuits of the receiver will enter an abnormal working state due to the direct current offset of the receiver, such that circuit properties, even functions such as error vector magnitude (EVM), gain and the like of the receiver, are affected. The DCOC is provided for solving this problem.

There are many implementation methods for the DCOC. Common methods include an input offset storing method, an output offset storing method, a pre-amplification method and a negative feedback loop method, etc. Each of the methods above can implement the cancellation of the offset. However, all of the methods are implementations based on a dynamic calibration. Such methods have the defects of slow calibration and convergence speeds and are not suitable for an application occasion of the receiver.

SUMMARY

To solve the technical problems in conventional art, the embodiments of the disclosure are mainly intended to provide a DCOC method and device.

The technical schemes of the embodiments of the disclosure are implemented as follows.

An embodiment of the disclosure provides a DCOC method, which includes:

after a receiver is powered on, obtaining a digital signal of an offset voltage at a circuit output port of the receiver; obtaining a digital control signal for controlling a DCOC output stage from the digital signal; and outputting, by the DCOC output stage, a current to a corresponding circuit of the receiver according to the digital control signal.

An embodiment of the disclosure provides a DCOC device, which includes: a DCOC Analog-to-Digital Converter (ADC), a digital signal processor and a DCOC output stage.

The DCOC ADC is configured, after a receiver is powered on, to obtain a digital signal of an offset voltage at a circuit output port of the receiver and to transmit the digital signal to the digital signal processor.

The digital signal processor is configured to obtain a digital control signal for controlling the DCOC output stage from the digital signal, and to transmit the digital control signal to the DCOC output stage.

The DCOC output stage is configured to output a current to a corresponding circuit of the receiver according to the digital control signal.

According to the DCOC method and device provided by the embodiments of the disclosure, after the receiver is powered on, the digital signal of the offset voltage at the circuit output port of the receiver is obtained, the digital control signal for controlling the DCOC output stage is obtained from the digital signal, and the DCOC output stage outputs the current to the corresponding circuit of the receiver according to the digital control signal. In this way, the direct current offset voltage of the receiver can be cancelled. Because of a static calibration mode of the disclosure, the circuit structure is simpler and more stable, and the convergence speed is faster, without taking the circuit stability into consideration.

DETAILED DESCRIPTION

The common DCOC methods may include an input offset storing method, an output offset storing method, a pre-amplification method, a negative feedback loop circuit and so on, and all have their own defects when being directly applied to a direct frequency conversion receiver. For example, the input offset storing method, the pre-amplification method and the output offset storing method need a support from a clock signal and requires the circuit, when the offset voltage is measured, to disconnect an input signal, which is not suitable for an application occasion of the receiver. In case of the negative feedback loop method, the circuit structure is very simple and has great advantages in power consumption and area. However, the working speed is relatively slow and the compensated output offset voltage range is limited. Particularly, for the offset of the circuit for receiving a calibration signal and the offset prior to the circuit, the negative feedback loop method may become helpless. The implementation schemes described above are based on a dynamic calibration structure and the convergence speed is relatively slow. Thus, in the direct frequency conversion receiver having a high gain, the disclosure adopts a static calibration DCOC circuit having a high speed and a simple current output.

In an embodiment of the disclosure, after a receiver is powered on, a digital signal of an offset voltage at a circuit output port of the receiver is obtained, a digital control signal for controlling a DCOC output stage is obtained from the digital signal, and the DCOC output stage outputs a current to a corresponding circuit of the receiver according to the digital control signal.

The disclosure will be further described in detail below in conjunction with accompanying drawings and specific embodiments.

Figure 1:
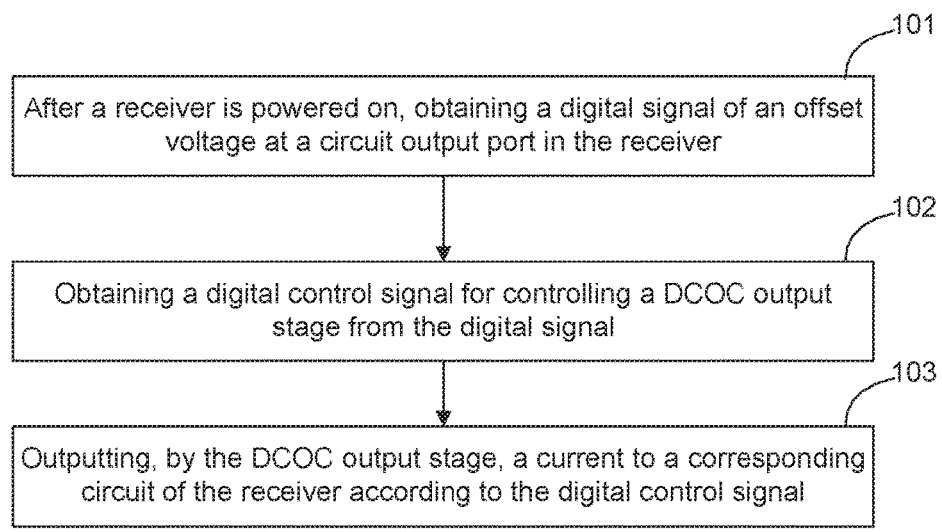
FIG. 1 is a flowchart of a DCOC method provided by an embodiment of the disclosure.

An embodiment of the disclosure provides a DCOC method. As shown in FIG. 1. The method includes the following steps.

In step 101, after a receiver is powered on, a digital signal of an offset voltage at a circuit output port of the receiver is obtained.

Specifically, after the receiver is powered on, a receiver input port does not receive an input signal. The offset voltage at the circuit output port of the receiver is measured by means of a DCOC ADC. And the measured offset voltage is converted into the digital signal.

Here, it is assumed that the offset voltage, measured by the DCOC ADC, at the circuit output port of the receiver is $AV_{os}$, $AV_{os}=(n1+x)*(I_{amp}*R_2)$, where n1 is an integer, x is a decimal smaller than 1 and greater than −1, $I_{amp}$ is a unit step current of a DCOC output stage, and $R_2$ is a resistance at a circuit output port of the receiver. The measured offset voltage is converted into the digital signal $DV_{os}$. And it is assumed that a Least Significant Bit (LSB) of the DCOC ADC is $V_{LSB}$, $$DV_{os} = (2^{11} - 1) + \frac{AV_{os}}{V_{LSB}} = 2047 + (n1+1)*\frac{I_{amp}*R_2}{V_{LSB}}.$$

In step 102, a digital control signal for controlling the DCOC output stage is obtained from the digital signal.

Specifically, the digital control signal for controlling the DCOC output stage is obtained by a digital signal processor performing a reverse operation on the digital signal. For example, for the offset voltage at the circuit output port of the receiver, as $(I_{amp}*R_2/V_{LSB})$ in the $DV_{os}$ is a constant value, the digital signal processor only needs to perform the reverse operation on the digital signal $DV_{os}$ transmitted from the DCOC ADC and on the constant value $(I_{amp}*R_2/V_{LSB})$, such that a binary value $$X1 = n1 + 1 = \frac{DV_{os} - 2047}{I_{amp}*R_2/V_{LSB}}$$

can be obtained. When a control port of the DCOC output stage is of 5-bit, the digital signal processor adds the binary value and 011111 to obtain the digital control signal for controlling the DCOC output stage.

In step 103, the DCOC output stage outputs a current to a corresponding circuit of the receiver according to the digital control signal.

Specifically, the DCOC output stage performs digital-to-Analog conversion on the digital control signal according to an own unit step current to obtain the current, and outputs the current to the corresponding circuit of the receiver.

Figure 2:
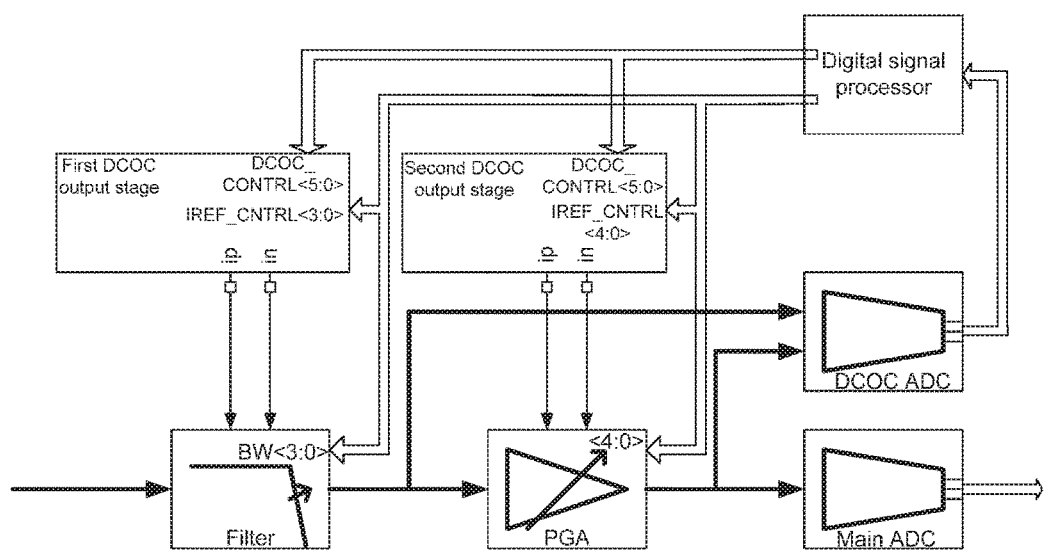
FIG. 2 is a schematic diagram showing a circuit connection of a DCOC method provided by an embodiment of the disclosure.

In the embodiment, as shown in FIG. 2, the receiver includes three stages, i.e. a filter, a Programmable Gain Amplifier (PGA) and a main ADC. The DCOC output stage includes a first DCOC output stage and a second DCOC output stage. The first DCOC output stage is used for current compensation of the filter, and the second DCOC output stage is used for current compensation of the PGA. The DCOC ADC measures the offset voltage at an output port of the filter and performs the current compensation on the filter at the first DCOC output stage, and then measures the offset voltage at an output port of the PGA and performs the current compensation on the PGA by the second DCOC output stage.

It is assumed that the offset voltage, measured by the DCOC ADC, at an output port of the filter in the receiver is $AV_{os\text{-}filter}$, $AV_{os\text{-}filter}=(n1+x)*(I_{1\text{-}amp}*R_{2\text{-}filter})$, where n1 is an integer, x is a decimal smaller than 1 and greater than −1, $I_{1\text{-}amp}$ is a unit step current of the first DCOC output stage, and $R_{2\text{-}filter}$ is a resistance at an output terminal of the filter. The measured offset voltage is converted into the digital signal $DV_{os\text{-}filter}$. It is assumed that the LSB of the ADC is $V_{LSB}$, then $$DV_{os\text{-}filter} = (2^{11}-1) + \frac{AV_{os\text{-}filter}}{V_{LSB}} = 2047 + (n1+1)*\frac{I_{1\text{-}amp}*R_{2\text{-}filter}}{V_{LSB}}.$$

As $(I_{1\text{-}amp\,2}*R_{1\text{-}filter}/V_{LSB})$ in the $DV_{os\text{-}filter}$ is a constant value, the digital signal processor only needs to perform the reverse operation on the digital signal $DV_{os\text{-}filter}$ transmitted from the DCOC ADC and on the constant value $(I_{1\text{-}amp}*R_{2\text{-}filter}/V_{LSB})$, such that a binary value $$X1 = n1 + 1 = \frac{DV_{os\text{-}filter} - 2047}{I_{1\text{-}amp}*R_{2\text{-}filter}/V_{LSB}}$$

can be obtained. When a control port of the first DCOC output stage is of 5-bit, the digital signal processor adds the binary value and 011111 to obtain the digital control signal for controlling the first DCOC output stage.

The first DCOC output stage includes: the control port DCOC_CONTRL<5:0>, a reference signal port IREF_CNTRL<3:0> and output ports ip and in. The DCOC_CONTRL<5:0> receives a 5-bit digital control signal, and the IREF_CNTRL<3:0> receives a bandwidth control signal BW<3:0> of a 3-bit filter so as to control an own unit step current $I_{1\text{-}amp}$. The bandwidth control signal BW<3:0> of the filter is transmitted by the digital signal processor. The output ports ip and in output the current, which is obtained by performing the digital-to-Analog conversion on the digital control signal according to the unit step current $I_{1\text{-}amp}$, to an input terminal of the filter, thereby performing the current compensation on the filter and realizing the DCOC of the filter.

After the first DCOC output stage performs the current compensation on the filter, the DCOC ADC measures the offset voltage at the output port of the PGA.

It is assumed that the offset voltage, measured by the DCOC ADC, at an output port of the PGA in the receiver is $AV_{os\text{-}PGA}$, $AV_{os\text{-}PGA}=(n1+x)*(I_{2\text{-}amp}*R_{2\text{-}PGA})$, where n1 is an integer, x is a decimal smaller than 1 and greater than −1, $I_{2\text{-}amp}$ is a unit step current of the second DCOC output stage, and $R_{2\text{-}PGA}$ is a resistance at an output terminal of the PGA. The measured offset voltage is converted into the digital signal $DV_{os\text{-}PGA}$. It is assumed that the LSB of the DCOC ADC is $V_{LSG}$, then $$DV_{os\text{-}PGA} = (2^{11}-1) + \frac{AV_{os\text{-}PGA}}{V_{LSB}} = 2047 + (n1+1)*\frac{I_{2\text{-}amp}*R_{2\text{-}PGA}}{V_{LSB}}.$$

As $(I_{2\text{-}amp}*R_{2\text{-}PGA}/V_{LSB})$ in the $DV_{os\text{-}PGA}$ is a constant value, the digital signal processor only needs to perform the reverse operation on the digital signal $DV_{os\text{-}PGA}$ transmitted from the DCOC ADC and on the constant value $(I_{2\text{-}amp}*R_{2\text{-}PGA}/V_{LSB})$, such that a binary value $$X1 = n1 + 1 = \frac{DV_{os\text{-}PGA} - 2047}{I_{2\text{-}amp}*R_{2\text{-}PGA}/V_{LSB}}$$

can be obtained. When a control port of the second DCOC output stage is of 5-bit, the digital signal processor adds the binary value and 011111 to obtain the digital control signal for controlling the second DCOC output stage.

The second DCOC output stage includes: the control port DCOC_CONTRL<5:0>, a reference signal port IREF_CNTRL<4:0> and output ports ip and in. The DCOC_CONTRL<5:0> receives a 5-bit digital control signal, and the IREF_CNTRL<4:0> receives an gain control signal <4:0> of a 4-bit PGA so as to control an own unit step current $I_{2\text{-}amp}$. The gain control signal <4:0> of the PGA is transmitted by the digital signal processor. The output ports ip and in output the current, which is obtained by performing the digital-to-Analog conversion on the digital control signal according to the unit step current $I_{2\text{-}amp}$, to an input terminal of the PGA, thereby performing the current compensation on the PGA and realizing the DCOC of the PGA.

Figure 3:
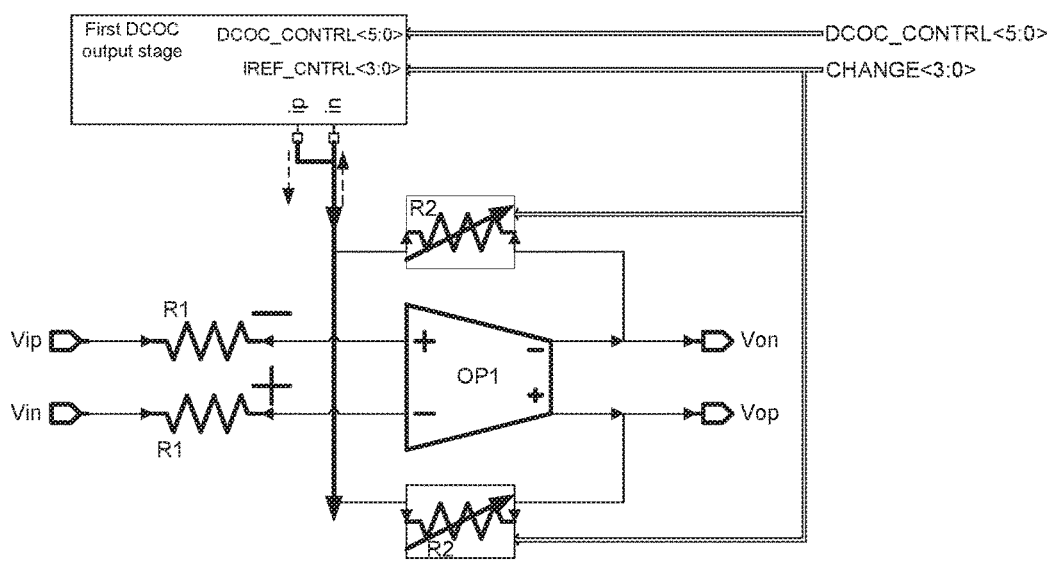
FIG. 3 is a schematic diagram showing a current compensation, performed by a first DCOC output stage, on a filter provided by an embodiment of the disclosure.

With the current compensation of the first DCOC output stage on the filter as an example, a working principle of the compensation is described in detail. As shown in FIG. 3, the filter is simplified into two input terminal resistors R1, two output terminal resistors R2 and an operational amplifier OP1. When the DCOC_CNTRL<5:0> of the first DCOC output stage is equal to 011111, the currents output from the ip and in ports respectively are $-0.5*I_{1\text{-}amp}$ and $+0.5*I_{1\text{-}amp}$, which are flowed to the output ports Von and Vop via the resistor R2. Because nodes net_p and net_n are located at an input port of the operational amplifier, the high-gain operational amplifier OP1 controls the two nodes at the same voltage. And meanwhile, common-mode voltages of the output ports Von and Vop are also confined at a set common-mode voltage Vcm. As a result, a differential output current will generate a differential voltage $I_{1\text{-}amp}*R2$, which is a compensation voltage, at the output ports. Therefore, the differential voltage (Vop-Von) generated by the first DCOC output stage at the output ports is up to a maximum value $+32*I_{1\text{-}amp}*R2$ when the DCOC_CNTRL<5:0> is equal to 111111, and up to a minimum value $-32*I_{1\text{-}amp}*R2$ when the DCOC_CNTRE<5:0> is equal to 000000, and the step length is $I_{1\text{-}amp}*R2$. At the first DCOC output stage, the amplitude of the $I_{1\text{-}amp}$ may be adjusted via the reference signal port IREF_CNTRL<3:0>. A resistance value of the R2 may vary according to a digital control word CHANGE<3:0> of the digital signal processor, so that the step length $I_{1\text{-}amp}*R2$ varies. Thus, the $I_{1\text{-}amp}$ may be adjusted via the IREF_CNTRL<3:0>. When a change occurs in the resistor R2, the $I_{1\text{-}amp}$ changes reversely, thereby guaranteeing the step length $I_{1\text{-}amp}*R2$ to be unchanged. Here, when the DCOC_CNTRL<5:0> is equal to n and the n is greater than 31, the voltage for compensating the filter is: $(n-31)*I_{1\text{-}amp}*R2$. When the DCOC_CNTRL<5:0> is equal to the n and the n is smaller than 32, the voltage for compensating the filter is: $(n-32)*I_{1\text{-}amp}*R2$.

Figure 4:
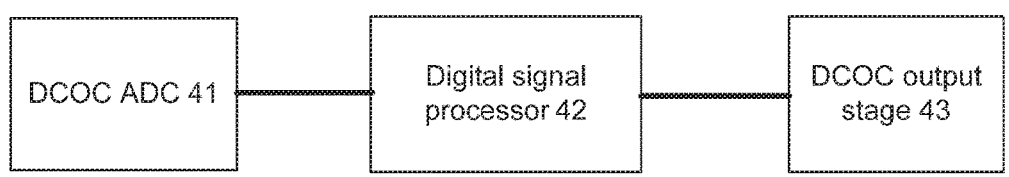
FIG. 4 is a structural diagram of a DCOC device provided by an embodiment of the disclosure.

Based upon the method above, the embodiment of the disclosure further provides a DCOC device. As shown in FIG. 4, the device includes: a DCOC ADC 41, a digital signal processor 42 and a DCOC output stage 43.

The DCOC ADC 41 is configured, after a receiver is powered on, to obtain a digital signal of an offset voltage at a circuit output port of the receiver and to transmit the digital signal to the digital signal processor 42.

The digital signal processor 42 is configured to obtain a digital control signal for controlling the DCOC output stage from the digital signal, and to transmit the digital control signal to the DCOC output stage 43.

The DCOC output stage 43 is configured to output a current to a corresponding circuit of the receiver according to the digital control signal.

The DCOC ADC 41 may be specifically configured to measure an offset voltage $AV_{os}$ at the circuit output port of the receiver, $AV_{os}=(n1+x)*(I_{amp}*R_2)$, where n1 is an integer, x is a decimal smaller than 1 and greater than $-1$, $I_{amp}$ is a unit step current of the DCOC output stage 43, and $R_2$ is a resistance at a circuit output port of the receiver. And the DCOC ADC 41 may be specifically configured to convert the measured offset voltage into the digital signal $DV_{os}$, $$DV_{os} = (2^{11} - 1) + \frac{AV_{os}}{V_{LSB}} = 2047 + (n1+1)*\frac{I_{amp}*R_2}{V_{LSB}},$$

where $V_{LSB}$ is an LSB of the DCOC ADC 41.

The digital signal processor 42 is specifically configured to perform a reverse operation on the digital signal $AV_{os}$ transmitted from the DCOC ADC 41 and on a constant value $(I_{amp}*R_2/V_{LSB})$ to obtain a binary value $$X1 = n1 + 1 = \frac{DV_{os} - 2047}{I_{amp}*R_2/V_{LSB}}.$$

When control ports of the DCOC output stage are of 5-bit, adds the binary value and 01111 to obtain the digital control signal for controlling the DCOC output stage.

The receiver includes three stages, i.e. a filter, a PGA and a main ADC. The DCOC output stage 43 includes a first DCOC output stage and a second DCOC output stage. The first DCOC output stage is used for current compensation of the filter, and the second DCOC output stage is used for current compensation of the PGA. The DCOC ADC 41 is specifically configured to measure the offset voltage at an output port of the filter and perform the current compensation on the filter at the first DCOC output stage, and then to measure the offset voltage at an output port of the PGA and perform the current compensation on the PGA by the second DCOC output stage.

The DCOC ADC 41 is specifically configured to measure an offset voltage $AV_{os\text{-}filter}$ at an output port of the filter, $AV_{os\text{-}filter}=(n1+x)*(I_{1\text{-}amp}*R_{2\text{-}filter})$, where n1 is an integer, x is a decimal smaller than 1 and greater than $-1$, $I_{1\text{-}amp}$ is a unit step current of the DCOC output stage, and $R_{2\text{-}filter}$ is a resistance at an output terminal of the filter. And the DCOC ADC 41 is specifically configured to convert the measured offset voltage into the digital signal $DV_{os\text{-}filter}$, $$DV_{os\text{-}filter} = (2^{11} - 1) + \frac{AV_{os\text{-}filter}}{V_{LSB}} = 2047 + (n1+1)*\frac{I_{1\text{-}amp}*R_{2\text{-}filter}}{V_{LSB}},$$

where $V_{LSB}$ is an LSB of the DCOC ADC 41.

The digital signal processor 42 is specifically configured to perform a reverse operation on the digital signal $DV_{os\text{-}filter}$ transmitted from the DCOC ADC 41 and on a constant value $(I_{1\text{-}amp}*R_{2\text{-}filter}/V_{LSB})$ to obtain a binary value $$X1 = n1 + 1 = \frac{DV_{os\text{-}filter} - 2047}{I_{1\text{-}amp}*R_{2\text{-}filter}/V_{LSB}}.$$

When control ports of the first DCOC output stage are of 5-bit, adds the binary value and 01111 to obtain the digital control signal for controlling the first DCOC output stage.

The first DCOC output stage includes: the control port DCOC_CONTRL<5:0>, a reference signal port IREF_CNTRL<3:0> and output ports ip and in. The DCOC_CON- TRL<5:0> receives a 5-bit digital control signal, and the IREF_CNTRL<3:0> receives a bandwidth control signal BW<3:0> of a 3-bit filter so as to control an own unit step current $I_{1\text{-}amp}$. The bandwidth control signal BW<3:0> of the filter is transmitted by the digital signal processor 42. The output ports ip and in output the current, which is obtained by performing the digital-to-Analog conversion on the digital control signal according to the unit step current $I_{1\text{-}amp}$, to an input terminal of the filter, thereby performing the current compensation on the filter and realizing the DCOC of the filter.

The DCOC ADC 41 is specifically configured, after the first DCOC output stage performs the current compensation on the filter, to measure the offset voltage $AV_{os\text{-}PGA}$ at the output port of the PGA, $AV_{os\text{-}PGA}=(n1+x)*(I_{2\text{-}amp}*R_{2\text{-}PGA})$, where n1 is an integer, x is a decimal smaller than 1 and greater than −1, $I_{2\text{-}amp}$ is a unit step current of the second DCOC output stage, and $R_{2\text{-}PGA}$, is a resistance at an output terminal of the PGA. And the DCOC ADC 41 is specifically configured to convert the measured offset voltage into the digital signal $DV_{os\text{-}PGA}$, $$DV_{os\text{-}PGA} = (2^{11}-1) + \frac{AV_{os\text{-}PGA}}{V_{LSB}} = 2047 + (n1+1)*\frac{I_{2\text{-}amp}*R_{2\text{-}PGA}}{V_{LSB}},$$

where $V_{LSB}$ is an LSB of the DCOC ADC 41.

The digital signal processor 42 is further configured to perform a reverse operation on the digital signal $DV_{os\text{-}PGA}$ transmitted from the DCOC ADC 41 and on a constant value $(I_{2\text{-}amp}*R_{2\text{-}PGA}/V_{LSB})$ to obtain a binary value $$X1 = n1+1 = \frac{DV_{os\text{-}PGA}-2047}{I_{2\text{-}amp}*R_{2\text{-}PGA}/V_{LSB}}.$$

The digital signal processor 42 is further configured to, when control ports of the second DCOC output stage are of 5-bit, add the binary value and 01111 to obtain the digital control signal for controlling the second DCOC output stage.

The second DCOC output stage includes: the control port DCOC_CONTRL<5:0>, a reference signal port IREF_CNTRL<4:0> and output ports ip and in. The DCOC_CONTRL<5:0> receives a 5-bit digital control signal, and the IREF_CNTRL<4:0> receives a gain control signal <4:0> of a 4-bit PGA so as to control an own unit step current $I_{2\text{-}amp}$. The gain control signal <4:0> of the PGA is transmitted by the digital signal processor 42. The output ports ip and in output the current, which is obtained by performing the digital-to-Analog conversion on the digital control signal according to the unit step current $I_{2\text{-}amp}$, to an input terminal of the PGA, thereby performing the current compensation on the PGA and realizing the DCOC of the PGA.

The above descriptions are only preferred embodiments of the disclosure and are not intended to limit the scope of protection of the disclosure. Any modifications, substitutions, improvements and the like made without departing from the spirit and the principle of the disclosure should fall within the protection scope of the disclosure.

INDUSTRIAL APPLICABILITY

According to the embodiments of the disclosure, the digital control signal for controlling the DCOC output stage is obtained by the digital signal of the offset voltage at the circuit output port of the receiver, so that the DCOC output stage outputs the corresponding current to the corresponding circuit of the receiver. In such way, the direct current offset voltage of the receiver can be cancelled. Because of the static calibration mode of the disclosure, the circuit structure is simpler and more stable, and the convergence speed is faster, without taking the circuit stability into consideration.

What is claimed is:

1. A direct current offset cancellation (DCOC) method, comprising:
    after a receiver is powered on, obtaining a digital signal of an offset voltage at a circuit output port of the receiver; obtaining a digital control signal for controlling a DCOC output stage from the digital signal; and outputting, by the DCOC output stage, a current to a corresponding circuit of the receiver according to the digital control signal;
    wherein obtaining the digital signal of the offset voltage at the circuit output port of the receiver comprises: measuring the offset voltage at the circuit output port of the receiver by a DCOC Analog-to-Digital Converter (ADC), wherein the offset voltage measured by the DCOC ADC is $AV_{os}$, $AV_{os}=(n1+x)*(I_{amp}*R_2)$, where n1 is an integer, x is a decimal smaller than 1 and greater than −1, $I_{amp}$ is a unit step current of the DCOC output stage, and $R_2$ is a resistance at a circuit output port of the receiver; and converting the measured offset voltage $AV_{os}$ into the digital signal $DV_{os}$, $$DV_{os} = (2^{11}-1) + \frac{AV_{os}}{V_{LSB}} = 2047 + (n1+1)*\frac{I_{amp}*R_2}{V_{LSB}},$$

where $V_{LSB}$ is a Least Significant Bit (LSB) of the DCOC ADC.

2. The method according to claim 1, wherein obtaining the digital control signal for controlling the DCOC output stage from the digital signal comprises: performing, by a digital signal processor, a reverse operation on the digital signal $DV_{os}$ transmitted from the DCOC ADC and on a constant value $(I_{amp}*R_2/V_{LSB})$ to obtain a binary value $$X1 = n1+1 = \frac{DV_{os}-2047}{I_{amp}*R_2/V_{LSB}};$$

and when control ports of the DCOC output stage are of 5-bit, adding, by the digital signal processor, the binary value and 011111 to obtain the digital control signal for controlling the DCOC output stage.

3. The method according to claim 1, wherein the receiver comprises a filter, a Programmable Gain Amplifier (PGA) and a main ADC; the DCOC output stage comprises a first DCOC output stage and a second DCOC output stage; the first DCOC output stage is used for current compensation of the filter; and the second DCOC output stage is used for current compensation of the PGA.

4. The method according to claim 3, wherein obtaining the digital signal of the offset voltage at the circuit output port of the receiver comprises: measuring, by the DCOC ADC, the offset voltage at an output port of the filter and performing the current compensation on the filter at the first DCOC output stage, and then measuring the offset voltage at an output port of the PGA and performing the current compensation on the PGA by the second DCOC output stage.

5. A direct current offset cancellation (DCOC) device, comprising: a DCOC Analog-to-Digital Converter (ADC), a digital signal processor and a DCOC output stage, wherein
the DCOC ADC is configured, after a receiver is powered on, to obtain a digital signal of an offset voltage at a circuit output port of the receiver and to transmit the digital signal to the digital signal processor;
the digital signal processor is configured to obtain a digital control signal for controlling the DCOC output stage from the digital signal, and to transmit the digital control signal to the DCOC output stage; and
the DCOC output stage is configured to output a current to a corresponding circuit of the receiver according to the digital control signal;
wherein the DCOC ADC is configured to measure that the offset voltage AVos at the circuit output port of the receiver, $AV_{os} = (n1+x)*(I_{amp}*R_2)$, where n1 is an integer, x is a decimal smaller than 1 and greater than −1, $I_{amp}$ is a unit step current of the DCOC output stage, and $R_2$ is a resistance at the circuit output port of the receiver; and to convert the measured offset voltage into the digital signal DVos, $$DV_{os} = (2^{11} - 1) + \frac{AV_{os}}{V_{LSB}} = 2047 + (n1 + 1) * \frac{I_{amp} * R_2}{V_{LSB}},$$

where $V_{LSB}$ is a Least Significant Bit (LSB) of the DCOC ADC.

6. The device according to claim 5, wherein the digital signal processor is configured to perform a reverse operation on the digital signal $DV_{os}$ transmitted from the DCOC ADC and on a constant value ($I_{amp}*R_2/V_{LSB}$) to obtain a binary value $$X1 = n1 + 1 = \frac{DV_{os} - 2047}{I_{amp} * R_2 / V_{LSB}};$$

and when control ports of the DCOC output stage are of 5-bit, to add the binary value and 011111 to obtain the digital control signal for controlling the DCOC output stage.

7. The device according to claim 5, wherein the receiver comprises a filter, a Programmable Gain Amplifier (PGA) and a main ADC; the DCOC output stage comprises a first DCOC output stage and a second DCOC output stage; the first DCOC output stage is used for current compensation of the filter; and the second DCOC output stage is used for current compensation of the PGA.

8. The device according to claim 7, wherein the DCOC ADC is configured to measure the offset voltage at an output port of the filter and perform the current compensation on the filter at the first DCOC output stage, and then to measure the offset voltage at an output port of the PGA and perform the current compensation on the PGA at the second DCOC output stage.

9. The device according to claim 8, wherein the first DCOC output stage comprises: the control port, a reference signal port and output ports; the control port receives a 5-bit digital control signal; the reference signal port receives a bandwidth control signal of a 3-bit filter so as to control an own unit step current; the bandwidth control signal of the filter is transmitted by the digital signal processor; the output ports output the current, which is obtained by performing digital-to-analog conversion on the digital control signal according to the unit step current, to an input terminal of the filter, thereby performing the current compensation on the filter.

10. The device according to claim 8, wherein the second DCOC output stage comprises: the control port, a reference signal port and output ports; the control port receives a 5-bit digital control signal; the reference signal port receives a gain control signal of a 4-bit PGA so as to control an own unit step current; the gain control signal of the PGA is transmitted by the digital signal processor; the output ports output the current, which is obtained by performing digital-to-analog conversion on the digital control signal according to the unit step current, to an input terminal of the PGA, thereby performing the current compensation on the PGA.

* * * * *